United States Patent Office 3,682,703
Patented Aug. 8, 1972

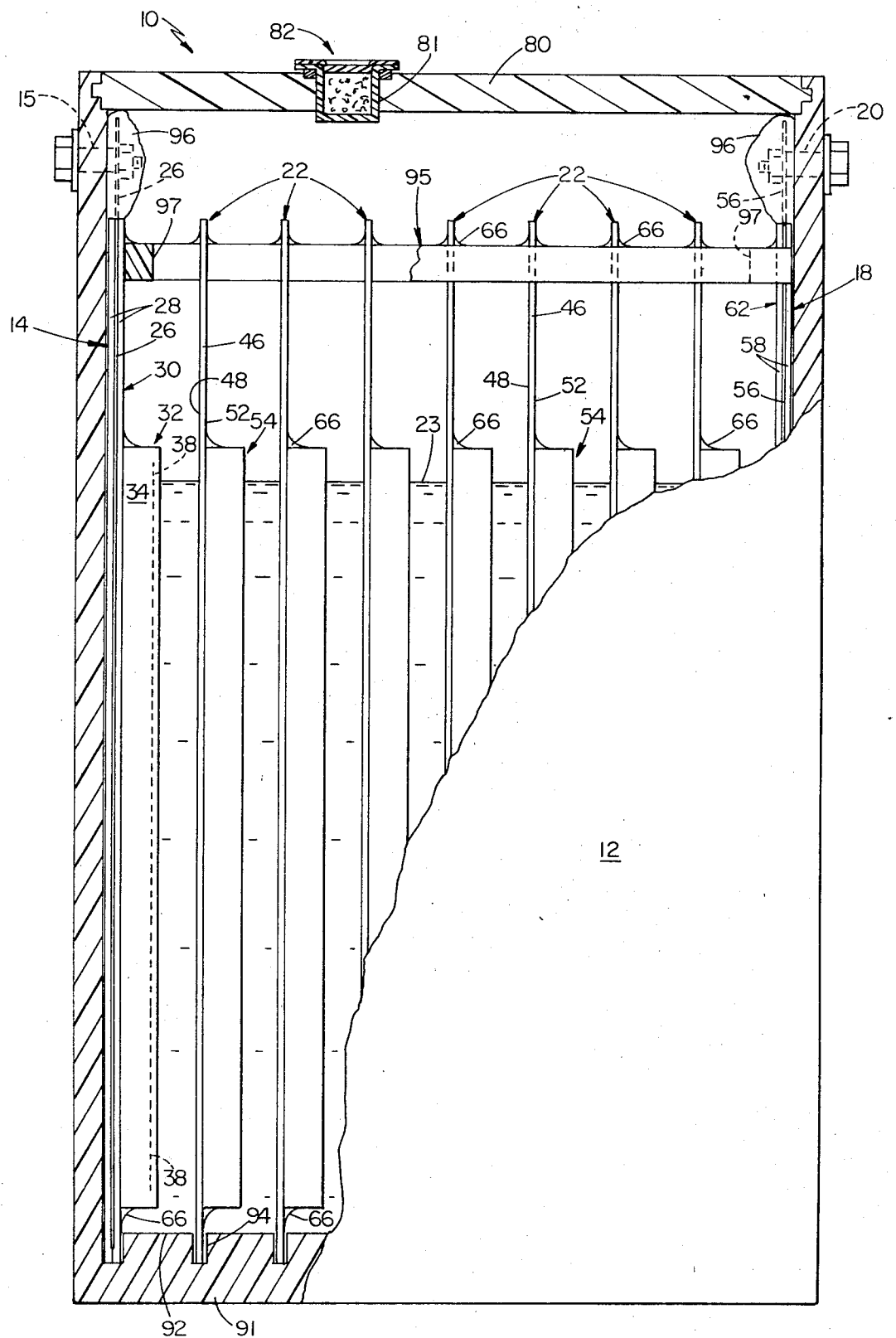

3,682,703
METAL BROMIDE SYSTEM
Herbert B. Smith, Mattapan, Mass., assignor to The Zito Company, Inc., Derry, N.H.
Filed Feb. 2, 1971, Ser. No. 111,944
Int. Cl. H01m 43/06
U.S. Cl. 136—6
5 Claims

ABSTRACT OF THE DISCLOSURE

A rechargeable battery comprising an anode, a cathode including a bromine-adsorbent layer capable of adsorbing at least half its weight of molecular bromine when the battery is charged, and an electrolyte solution comprising a divalent electroplatable metal bromide salt, 2 to 10 gms., per liter of electrolyte solution, of $AlCl_3 \cdot 6H_2O$, and 1 to 4 gms., per liter of electrolyte solution, of $KAl(SO_4)_2 \cdot 12H_2O$.

---

This invention relates to rechargeable metal bromide batteries.

The object of this invention is to improve metal electroplating during the charging cycle of such batteries.

Another object is to provide an improved electrolyte system for metal bromide batteries, providing dense, uniform electroplate layers over repeated charging cycles, and hence efficient and reproduceable discharging cycles.

Another object is to provide an improved zinc bromide battery.

The invention features a rechargeable battery comprising an anode, a cathode including a bromine-adsorbent layer capable of adsorbing at least half its weight of molecular bromine when the battery is charged, and an electrolyte solution comprising a divalent electroplatable metal bromide salt, 2 to 10 gms., per liter of electrolyte solution, of $AlCl_3 \cdot 6H_2O$, and 1 to 4 gms., per liter of electrolyte solution, of $KAl(SO_4)_2 \cdot 12H_2O$.

In a preferred embodiment, the divalent metal bromide salt is zinc bromide, the amount of this salt is such that its concentration is less than 1.5 moles/liter, and preferably less than 0.0005 mole/ml. when the battery is fully charged, and the bromine adsorbent is activated carbon.

Other objects, features and advantages will be apparent to one skilled in the art from the following description of a preferred embodiment of the invention, taken together with the attached drawing thereof.

The figure shows a plan view of a metal bromide battery embodying the present invention, with the forward side of the battery housing partially broken away. The battery is of the type described in the assignee's copending United States patent application, Ser. No. 112,254, filed Feb. 3, 1971, in the name of Ralph Zito, Jr., and entitled "Halogen System." Reference is made to that application for details of making this battery, suitable materials, and the like.

As shown in the figure, battery 10 includes a polyethylene housing 12 of which the forward side has been partially broken away to expose the interior of the battery. The battery has a terminal cathode 14, electrically connected to a terminal cathode screw 15, which extends through the housing 12, a terminal anode 18 at its other end which is electrically connected to an anode terminal screw 20 which also extends through the housing 12, a plurality (7) of intermediate or composite electrodes 22, all arranged generally in parallel and spaced apart from one another, and a liquid electrolyte medium 23.

The terminal cathode 14 has a copper screen 26, the major portion of which is sandwiched between two bromine inert and bromine impermeable electroconductive layers 28, each of which is formed of a 50–50 by weight mixture of electroconductive graphite particles bonded together by poly (vinylidene fluoride) ("Kynar") particles, the graphite and bonding agent being bonded together under heat and pressure to form an integral electroconductive layer. Each layer 28 is capable of conducting electricity across its thickness from its exposed face through copper screen 26 and has a thickness of about 25 mils. The layers 28 are bonded to one together through the openings in copper screen 26.

Firmly secured to the exposed cathode surface 30, which has an exposed surface area of about 120 (10 in. x 12 in.) square inches, is a bromine adsorbent structure 32, which consists of an interior bromine adsorbent layer 34 and a surface layer 38 firmly secured to the adsorbent layer 34. Adsorbent layer 34 is formed of at least about 90% by weight of bromine adsorbent activated carbon particles, and the remainder of a polyethylene bonding agent effective to bond the carbon particles into an integral adsorbent mass. The layer 34 has a thickness on the order of about 120 mils. Surface layer 38 has a thickness on the order of about 30 mils and is formed of at least about 90% by weight of electrically non-conductive particles ("Celite 560," available from Johns-Manville Co.) bonded together into an integral non-conductive mass by a polyethylene bonding agent. These particles are porous, inert to bromine and electrolyte, and do not adsorb bromine.

Each composite electrode 22 has a single electroconductive layer 46, identical to the layers 28 and 29 of terminal cathode 14, and approximately 25 mils thick. A thin coating of the above-described electrically non-conductive particles may be bonded (e.g., directly to the poly (vinylidene fluoride) bonding agent of electroconductive layer 46) onto the exposed anode surface 48 of electroconductive layer 46, as described in the above-described copending patent application. Secured to the opposite surface 52 of electroconductive layer 46 is a bromine entrapment structure 54 identical to the bromine entrapment structure 32 of terminal cathode 14.

Terminal anode 18 has a copper screen 56, identical to copper screen 26 of terminal cathode 14, the major portion of which is sandwiched between two bromine inert and bromine impermeable electroconductive layers 58, which are identical to the electroconductive layers 28 of terminal cathode 14 and are identically bonded to one another through the openings of screen 56. The exposed anode face 62 of electroconductive layer 58 may have a thin coating of the above-described electrically non-conductive particles identical to the coating described on the anode face 48 of composite electrode 22. Exposed portions of the electroconductive and adsorbent layers are coated with a gas-permeable bromine-inert sealer 66 such as the silicon rubber sealer available from General Electric Company under the trade name "RTV."

The battery housing 12 has in its cover 80 an opening 81, sized to receive a generally cylindrical gas escape cap 82 which seals the interior of the battery. As shown in FIG. 1, cap 82 is formed of a gas-permeable (but liquid and solid-impermeable) and bromine inert materials, such as polyethylene, and is at least partially filled with a material (such as zinc filings) which will remove bromine from gases coming from the battery through the interior cap wall, but not other gases, such as oxygen and hydrogen.

The bottom wall 91 of housing 12 has a number of upstanding ribs 92, defining therebetween grooves 94. The housing 12 also includes a spacer 95, through which the electroconductive layers protrude, and to which they are sealed by a bromine-inert and bromine- and liquid-impermeable epoxy resin 96. The spacer 95 has an elongated opening 97, about 1 inch wide, for filling the battery. The screens 26, 56 and interior portions of the screws 15 and 20 are also patted in the epoxy 96. When the electrodes are secured in place, the battery is filled with electrolyte solution (e.g., by vacuum impregnation) so that the bromine-adsorbent layers become saturated with electrolyte all the way into the electroconductive (graphite-fluorocarbon) layers.

The electrolyte 23 includes an aqueous medium having a dissolved salt of bromine and a divalent electroplatable metal which is electrolyzed during the charging cycle of the battery (i.e., by connecting a voltage source across the battery to terminal screws 15 and 20), the metal electroplating on the anode electroplating surfaces and the bromide ions forming molecular bromine, which is substantially entrapped within the bromine-adsorbent layer. The bromine-adsorbent activated carbon layer forms bonds with bromine molecules of sufficient energy to keep the bromine molecules near the cathode during charging and charged periods, yet of low enough energy so as not to interfere with ionization of bromine during the discharge cycle. The divalent electroplatable metal is repeatedly electroplatable and is not corroded in the liquid electrolyte medium, and the metal bromide salt is sufficiently soluble in the liquid medium to be electroplatable. Where an aqueous liquid medium is employed, among the useful metals are, e.g. zinc, nickel, cadmium, tin (stannous), lead, and copper (cupric).

The illustrated electrolyte is zinc bromide in an aqueous solution. This salt has a reasonably high potential of 1.83 volts, is highly soluble in water to provide a low resistivity electrolyte, and has a calculated free energy per pound of about 200 watt-hours.

The amount of the divalent metal bromide salt is such that substantially all of the bromine formed in charging is adsorbed. Thus, it is preferred that when the battery reaches full charge, the amount of the remaining dissolved metal bromide salt be less than about 0.0005 mole/ml. The amount of adsorbent used (and hence the amount of bromine adsorbable thereby) depends on the size desired for the battery as well as the desired watt-hour output. The bromine adsorptivity of the particular adsorbent may be determined conveniently by immersing the adsorbent, formed into a layer, into a mixture of liquid bromine and an electrolyte (containing the bromine salt to be utilized in the battery), and measuring the bromine uptake at intervals by determining the amount of free bromine left in an aliquot portion of the mixture. In general, activated carbon (coconut charcoal or a synthetic equivalent) particles adsorb bromine in the range of about one gram of bromine per gram of carbon, and, when bonded into an adsorbent layer such as shown, the adsorptivity is still greater than about 0.5 gm./gm.

The use of such low molarity salt solutions is desired for a number of reasons, not the least of which is to avoid the problems of overcharging. Since all bromine is adsorbed, even if the battery is overcharged, very little bromine in excess of that which can be adsorbed in the bromine-adsorbent layer will be formed. Hence, concentrations of free bromine which might otherwise, because of the high specific gravity of bromine, collect near the bottom of the battery, migrate to the anode, and dissove electroplated zinc, will be avoided. If this were to occur, the dissolved zinc would replate out above the bromine-adjacent portions of the anode (because of the high resistance due to bromine). Further, at discharge, the effective area of the anode would be reduced, and hence also the load voltage. Repeated charge and discharge cycles would further aggravate the problem, until zinc growth near the upper part of the anode would become sufficient to traverse the battery to the cathode, causing shorting. By limiting the molarity of the electrolyte as described, however, the total effective area of anode (and cathode) remains the same, even after many charge and discharge cycles. However, such low divalent bromide salt concentrations (e.g., below 1.5 molar for zinc bromide) are not conductive to good metal electroplating—i.e., dense, uniform electroplate, formed consistently in repeated charging cycles. Thus, the electrolyte also includes 2 to 10 gms., per liter of salt solution of $AlCl_3 \cdot 6H_2O$, and 1 to 4 gms. per liter of salt solution of $KAl(SO_4)_2 \cdot 12H_2O$.

Where such additives are utilized, the advantages of low salt concentrations are realized while improved electroplates are also achieved.

Other embodiments will occur to those skilled in the art and are within the following claims.

What is claimed is:

1. A rechargeable battery comprising an anode, a cathode including a bromine-adsorbent layer capable of adsorbing at least half its weight of molecular bromine when the battery is charged, and an electrolyte solution comprising a divalent electroplatable metal bromide salt, 2 to 10 gms., per liter of said solution, of $AlCl_3 \cdot 6H_2O$, and 1 to 4 gms., per liter of said solution, of $KAl(SO_4)_2 \cdot 12H_2O$.

2. The battery of claim 1 wherein said metal bromide salt is zinc bromide.

3. The battery of claim 2 wherein the amount of said salt is such that the concentration thereof is less than 1.5 molar when said battery is fully charged.

4. The battery of claim 3 wherein said electrolyte solution comprises less than 0.0005 moles/ml. of zinc bromide salt when said battery is fully charged.

5. The battery of claim 1 wherein said bromine adsorbent is activated carbon.

References Cited

UNITED STATES PATENTS

| | | | |
|---|---|---|---|
| 2,407,489 | 9/1946 | Gray | 204—55 R |
| 3,285,781 | 11/1966 | Zito | 136—6 |
| 3,373,058 | 3/1968 | Bloch | 136—155 |
| 3,408,232 | 10/1968 | Blue et al. | 136—155 |
| 3,578,503 | 5/1971 | Bloch et al. | 136—83 R |

DONALD L. WALTON, Primary Examiner

U.S. Cl. X.R.

136—155